US009014722B2

(12) United States Patent  
Cole et al.

(10) Patent No.: US 9,014,722 B2  
(45) Date of Patent: *Apr. 21, 2015

(54) DYNAMIC SERVICE BINDING PROVIDING TRANSPARENT SWITCHING OF INFORMATION SERVICES HAVING DEFINED COVERAGE REGIONS

(75) Inventors: Alan George Cole, Katonah, NY (US); Sastry S. Duri, Yorktown Heights, NY (US); Jonathan Paul Munson, Putnam Valley, NY (US); John S. Murdock, Jr., New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 445 days.

This patent is subject to a terminal disclaimer.

(21) Appl. No.: 12/128,737

(22) Filed: May 29, 2008

(65) Prior Publication Data

US 2008/0261621 A1  Oct. 23, 2008

Related U.S. Application Data

(63) Continuation of application No. 11/839,310, filed on Aug. 15, 2007, now Pat. No. 7,428,418, which is a continuation of application No. 11/345,688, filed on Jan. 27, 2006, now Pat. No. 7,274,941, which is a continuation of application No. 10/315,650, filed on Dec. 10, 2002, now abandoned.

(51) Int. Cl.  
*H04M 3/00* (2006.01)  
*H04W 24/00* (2009.01)  
(Continued)

(52) U.S. Cl.  
CPC ............. *H04L 29/06* (2013.01); *H04W 4/02* (2013.01); *H04W 4/16* (2013.01); *H04L 67/16* (2013.01); *H04L 67/18* (2013.01); *H04L 69/329* (2013.01)

(58) Field of Classification Search  
USPC ............... 455/41.2, 401, 404.2, 414.1–414.4, 455/418–421, 436–444, 447–451, 455/452.1–452.2, 432.1–432.3, 433–434, 455/456.1–456.3, 456.5–456.6, 466, 517, 455/550.1, 552.1, 556.2, 557–558, 455/560–561, 422.1, 435.2–435.3, 453, 455/509, 512–514; 370/310, 438–329, 338, 370/341, 312, 331–333, 901–902, 908, 370/912–913; 709/202–203, 218–219, 709/228–229; 713/163

See application file for complete search history.

(56) References Cited

U.S. PATENT DOCUMENTS 5,060,165 A  10/1991  Schumacher et al.  
5,771,381 A  6/1998  Jones et al.  
(Continued)

FOREIGN PATENT DOCUMENTS

DE  100 56 519 A  5/2002  
EP  1 041 831 A1  10/2000  
(Continued)

OTHER PUBLICATIONS

"Department of Defense Solutions," An ispheres White Paper.  
(Continued)

*Primary Examiner* — Meless Zewdu  
(74) *Attorney, Agent, or Firm* — Ryan, Mason & Lewis, LLP (57) ABSTRACT

It is determined whether a location of a mobile device is within a coverage region of a first information service. Communications for the first information service are redirected to a second information service when the location of the mobile device is not within a coverage region of the first information service. The second information service generally has a coverage region encompassing the location of the mobile device. Communications between the mobile device and the first information service are redirected to a new information service when properties of the new information service are determined to meet predetermined criteria set by a user of the mobile device, by an application, or both. In yet another aspect of the invention, replacement of information services can be "aggressive" or "non-aggressive." Communications between the mobile device and an original information service are redirected to another information service when the original information service fails.

25 Claims, 7 Drawing Sheets

(51) Int. Cl.
*H04M 1/00* (2006.01)
*H04L 29/06* (2006.01)
*H04W 4/02* (2009.01)
*H04W 4/16* (2009.01)
*H04L 29/08* (2006.01)

(56) References Cited

U.S. PATENT DOCUMENTS

| | | | |
|---|---|---|---|
| 5,819,284 A | 10/1998 | Farber et al. | |
| 5,974,300 A | 10/1999 | LaPorta et al. | |
| 5,982,870 A | 11/1999 | Pershan et al. | 379/221 |
| 5,987,013 A * | 11/1999 | Kabasawa | 370/331 |
| 6,044,224 A | 3/2000 | Radia et al. | |
| 6,088,598 A | 7/2000 | Marsolais | |
| 6,128,491 A | 10/2000 | Augustinus | 455/434 |
| 6,161,015 A | 12/2000 | Birchler et al. | |
| 6,167,250 A * | 12/2000 | Rahman et al. | 455/406 |
| 6,182,087 B1 | 1/2001 | Lim | |
| 6,236,978 B1 | 5/2001 | Tuzhilm | |
| 6,321,089 B1 * | 11/2001 | Han | 455/438 |
| 6,336,035 B1 | 1/2002 | Somoza et al. | |
| 6,400,944 B1 | 6/2002 | Alperovich et al. | |
| 6,405,038 B1 | 6/2002 | Barber et al. | 455/434 |
| 6,415,323 B1 * | 7/2002 | McCanne et al. | 709/225 |
| 6,445,918 B1 * | 9/2002 | Hellander | 455/423 |
| 6,459,783 B1 | 10/2002 | March et al. | |
| 6,463,464 B1 | 10/2002 | Lazaridids et al. | 709/207 |
| 6,466,796 B1 * | 10/2002 | Jacobson et al. | 455/456.3 |
| 6,480,861 B1 * | 11/2002 | Kanevsky et al. | 1/1 |
| 6,496,704 B2 | 12/2002 | Yuan | 455/466 |
| 6,512,922 B1 | 1/2003 | Burg et al. | |
| 6,519,455 B1 * | 2/2003 | McCormick et al. | 455/438 |
| 6,556,823 B2 | 4/2003 | Clapton et al. | 455/432.3 |
| 6,611,751 B2 | 8/2003 | Warren | 701/200 |
| 6,714,789 B1 * | 3/2004 | Oh et al. | 455/456.1 |
| 6,721,401 B2 | 4/2004 | Lee et al. | 379/93.17 |
| 6,957,393 B2 | 10/2005 | Fano et al. | 715/747 |
| 7,024,205 B1 * | 4/2006 | Hose | 455/456.1 |
| 7,245,914 B2 * | 7/2007 | Ishikawa | 455/436 |
| 7,274,941 B2 | 9/2007 | Cole et al. | 455/456.1 |
| 2002/0007468 A1 | 1/2002 | Kampe et al. | |
| 2002/0029258 A1 | 3/2002 | Mouseau et al. | 709/218 |
| 2002/0061741 A1 | 5/2002 | Leung et al. | 456/414 |
| 2002/0078300 A1 | 6/2002 | Dharap | 711/133 |
| 2002/0141369 A1 * | 10/2002 | Perras | 370/338 |
| 2002/0155844 A1 | 10/2002 | Rankin et al. | 455/456 |
| 2002/0168959 A1 * | 11/2002 | Noguchi et al. | 455/405 |
| 2003/0105763 A1 * | 6/2003 | Chatfield et al. | 707/10 |
| 2003/0140088 A1 | 7/2003 | Robinson et al. | 709/202 |
| 2003/0193910 A1 | 10/2003 | Shoaib et al. | 370/331 |
| 2004/0076145 A1 | 4/2004 | Kauhannen et al. | 370/352 |
| 2006/0068599 A1 * | 3/2006 | Baek et al. | 438/758 |

FOREIGN PATENT DOCUMENTS

| | | | |
|---|---|---|---|
| EP | 1 069 792 A | 1/2001 | |
| EP | 1069 792 A1 | 1/2001 | H04Q 7/22 |
| JP | 2002278886 A2 | 9/2002 | |
| WO | WO 00 79811 A | 12/2000 | |
| WO | WO 00/79811 A1 | 12/2000 | |

OTHER PUBLICATIONS

"iSpheres Halo: Real-Time Event Server; Event Management and Alerting System for the Adaptive Enterprise,".
"Technical White Paper," Event Server Architecture.
"Profilium Pinpoint," http://www.profilium.com/solutions/pinpoint.html, downloaded Apr. 3, 2003.
"Profilium: Infrastructure: Triggers," http://www.profilium.com/infra/triggers.html, downloaded Apr. 3, 2003.
"Profilium: Infrastructure: Services—Features," http://www.profilium.com/infra/features.html, downloaded Apr. 3, 2003.

* cited by examiner

| SERVICE PROPERTIES 240 | | | | | |
|---|---|---|---|---|---|
| SERVICE | COVERAGE REGION | CAPABILITY NAMES | FORMATS | COST | SPECIALTY |
| MAPPING | NORTHEASTERN U.S. | IMAGE-FORMATS | GIF, JPEG, JPG | FREE | DETAILED LOCAL MAPS |
| MAPPING | COORDINATE1...COORDINATEN | IMAGE-FORMATS | GIF | FREE | RETAIL ESTABLISHMENTS |
| DIRECTORY SERVICES | NEW YORK | IMAGE-FORMATS, TEXT-FORMATS | TXT, HTML | FREE | PAYING RETAIL ESTABLISHMENTS |
| DIRECTORY SERVICES | WESTCHESTER COUNTY, N.Y. | IMAGE-FORMATS, TEXT-FORMATS | TXT, HTML, XML, GIF, JPEG, JPG | PER ACCESS | ALL RETAIL ESTABLISHMENTS |

FIG. 3

(<"image-formats", "JPEG GIF">
 <"image-formats", "TIF">)

| USER | SERVICE PROPERTIES | | |
|---|---|---|---|
| | PREFERENCE | PREFERENCE | CARRIER |
| USER A | FREE SERVICES | NON-AGGRESSIVE | MOBILE CARRIER 1 |
| USER B | COMPREHENSIVE SERVICES | AGGRESSIVE | MOBILE CARRIER 2 |

FIG. 8

DYNAMIC SERVICE BINDING PROVIDING TRANSPARENT SWITCHING OF INFORMATION SERVICES HAVING DEFINED COVERAGE REGIONS

CROSS-REFERENCE TO RELATED APPLICATION

This application is a continuation application of U.S. patent application Ser. No. 11/839,310, filed Aug. 15, 2007, (now U.S. Pat. No. 7,428,418), which is a continuation of U.S. patent application Ser. No. 11/345,688, filed Jan. 27, 2006, (now U.S. Pat. No. 7,274,941), which is a continuation of U.S. patent application Ser. No. 10/315,650, filed Dec. 10, 2002 (now abandoned), each incorporated by reference herein.

FIELD OF THE INVENTION

The present invention relates to communication systems and, more particularly, relates to communication systems where devices travel between areas, such as cellular phone systems.

BACKGROUND OF THE INVENTION

The mobility of devices has become highly desirable. Moreover, many devices now interact with wireless systems and, consequently, many devices are blurring the line between wireless networks and traditional computer systems. For instance, some personal digital assistants can connect to wireless networks, such as a cellular phone network, while many cellular telephones now connect to the Internet through wireless networks.

A benefit of mobile devices is that the devices can be used to connect to local information services, such as information services providing local traffic, weather, or telephone numbers, when traveling. It is possible for a person using a cellular phone to determine the phone number of a local pizza parlor, for instance, or learn what the traffic is like on a major thoroughfare.

While the mobility of devices is desirable, it can also create problems. For instance, information services that provide traffic reports are only valid for particular areas Therefore, a person whose cellular phone is set to connect to a local Internet site providing local traffic information will not be of use when the person is at a remote location. Similarly, information services that provide directory services such as telephone numbers and addresses usually have only a certain geographical area for which the provided information is relevant. Outside this geographical area, the information is generally irrelevant.

Thus, what is needed are techniques for allowing mobile devices to access services when the mobile devices travel between areas.

SUMMARY OF THE INVENTION

The present invention provides methods and apparatus for dynamic service binding, providing transparent switching of information services. In general, the information services have defined coverage regions, such that a mobile device will interact with one information service in a first location but the mobile device may interact with another information service when the mobile device is in another location.

In one aspect of the invention, it is determined whether a location of a mobile device is within a coverage region of a first information service. One or more communications for the first information service are redirected to a second information service when the location of the mobile device is not within a coverage region of the first information service. In an exemplary embodiment, the second information service has a coverage region encompassing the new location of the mobile device In another aspect of the invention, communications between a mobile device and a first information service are redirected to another information service when one or more properties of the new information service are determined to meet predetermined criteria In one illustrative embodiment, the predetermined criteria may be set by a user of the mobile device, by an application, or both.

In yet another aspect of the invention, replacement of information services can be "aggressive" or "non-aggressive." For instance, a new information service may become available to a user, and the new information service, if adjudged to more adequately meet preferences of the user, will replace an original information service being used by the user, even if the original information service is still valid. This is called aggressive replacement of information services herein. In a non-aggressive replacement, the original information service, if still valid based on a location of the user, will not be replaced and will remain in use In yet another aspect of the invention, communications between a mobile device and an original information service are redirected to another information service when the original information service fails.

A more complete understanding of the present invention, as well as further features and advantages of the present invention, will be obtained by reference to the following detailed description and drawings.

DETAILED DESCRIPTION OF PREFERRED EMBODIMENTS

There are applications in which the location of a person of an object is used to shape or focus the service The integration of technologies that accurately determine location, such as global positioning system (GPS) information, into many devices makes these types of applications more convenient by sparing users the need to self-describe their locations These technologies also enable new applications, such as a driving assistant that proactively alerts a drivel to traffic congestion ahead and suggests an alternate route. These sorts of applications are expected to be especially valuable to mobile users.

But just as mobility is a core driver of these types applications, it also presents certain challenges. In particular, mobility creates the possibility that a change in location may result in the loss of a particular information service in communication with an application. By nature, many information services are associated with a certain geographical area, called a "coverage region" herein. A traffic-congestion reporting information service, for example, may offer information for only certain metropolitan areas Therefore, an information service that is valid for one location may not be valid for another. As a user of an information service moves, that information service may eventually become invalid. It should be noted herein that the term "user" includes a mobile device whose location can be determined.

It is also true that, as one information service becomes invalid due to a change in location, another information service of the same kind may become valid As a particular example, suppose a user subscribes to the driving-assistance application mentioned above, which offers notification of traffic congestion. As the user travels from New York to Philadelphia, there may be different traffic congestion reporting information services available—one for New York City, one for the New Jersey Turnpike, and another for the Philadelphia area. It would be desirable for the driving assistance application to switch from a reporting information service that is no longer valid for the current location to another that does offer service for the current location, and to do so in a manner that is transparent to the user and to the application being used by the user. This is referred to as "dynamic service binding" herein, as an information service is "bound" to a particular application through certain techniques.

Consider what might be beneficially used to implement dynamic service binding in the specific case of the driving assistant example, for instance. First, a dynamic service binding system should keep track of various reporting information services and their respective coverage regions Second, the dynamic service binding system should periodically obtain the location of a user (e.g., a location of a mobile device used by the user) to determine whether the current reporting service is still valid for the current location. If not, the dynamic service binding system should select an appropriate information service valid for the new location and switch to the valid information service.

Note that, since it is assumed that the various traffic reporting information services used will be from independent providers, it is also assumed that the various information services may have different programming interfaces, including different invocation mechanisms, and that the information services will use different authentication and authorization mechanisms Thus, it is beneficial for dynamic service binding to also manage these issues It may be possible for individual applications to perform dynamic service binding. Given the level of support required, however, and the fact that dynamic service binding is useful across a wide range of applications for mobile users, it is desirable to factor this support out of applications, and offer it in the form of a dynamic service binding system that acts as an intermediary between applications and lower-level services FIG. 1 shows an exemplary location for a dynamic service binding system within a larger application architecture.

Figure 1:
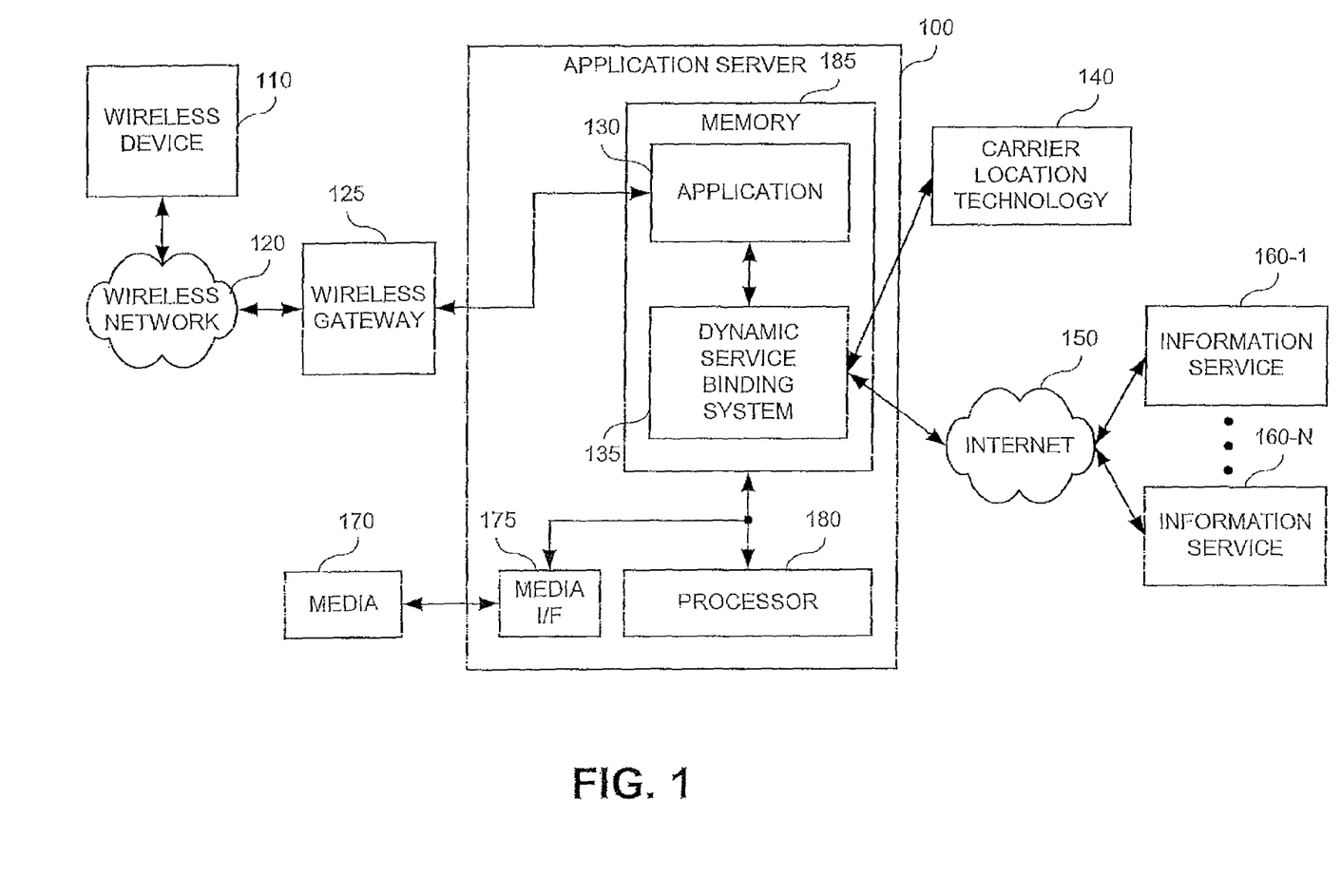
FIG. 1 is a block diagram of an exemplary application server interacting with a wireless device through a wireless network, with carrier location technology, with information services through the Internet, and with media in accordance with one embodiment of the present invention.

Referring now to FIG. 1, a block diagram is shown of an exemplary application server 100 interacting with a wireless device 110 through a wireless network 120 and a wireless gateway 125, with carrier location technology 140, and with information services 160-1 through 160-N (collectively information services 160) through, for instance, the Internet 150 Application server 100 comprises a memory 130, a processor 180, and a media interface 175. Application server 100 interacts with media 170 through media interface 175. Memory 185 comprises an application 130 and a dynamic service binding system 135.

Application server 100 generally resides on the Internet, such as Internet 150 As another example, in an intranet, the application server 100 could be a server on the intranet and connected to an access point or several access points.

Generally, wireless device 110 accesses application 130 through wireless network 120 and wireless gateway 125 The application 130 accesses one or more of the information services 160. For instance, the wireless device could be executing an Internet browser (not shown) that is accessing an application 130 that is a JAVA applet in order to determine a telephone number for a local restaurant.

Because quite a few different applications can benefit from changing information services 160 as the location of wireless device 110 changes, the dynamic service binding system 135 provides an interface to the application 130 and provides transparent binding of one or more information services 160 to the application 130

Figure 2:
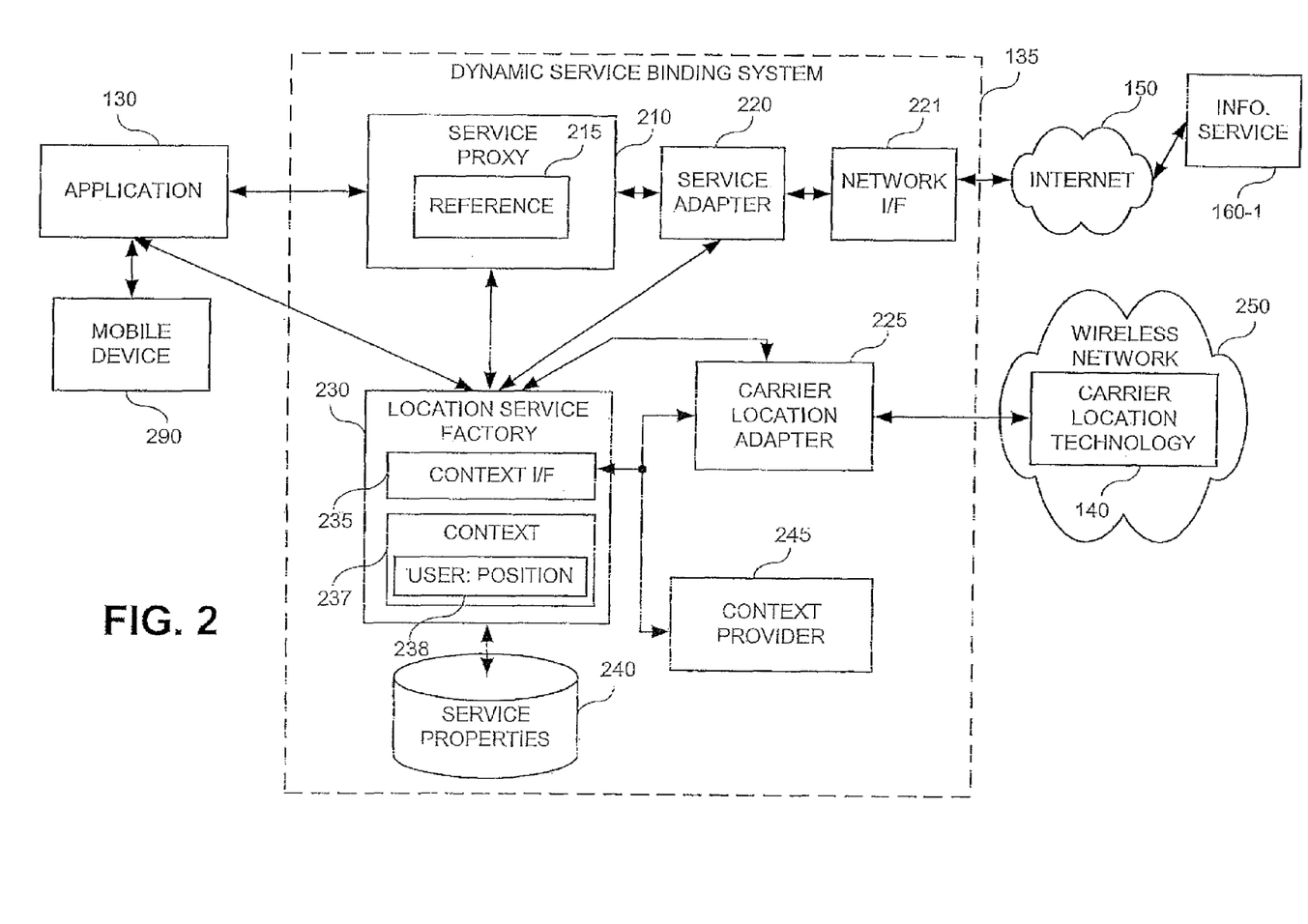
FIG. 2 is a block diagram of an exemplary dynamic service binding system interacting with a mobile device through an application, with wireless network, and with the Internet, in accordance with one embodiment of the present invention.

Usually, the dynamic service binding system 135 determines the location of the wireless device 110 via carrier location technology 140, which is generally implemented by wireless network 120. For instance, some cellular technology now uses a GPS receiver built into a wireless device 110, and the wireless network would contain carrier location technology 140 in order to determine the location of a wireless device 110. Carrier location technology 140 is intended to encompass any technique for determining a location of a mobile device. Regardless of the technique being used, the dynamic service binding system 135 uses the location of wireless device 110 in order to select an information service 160 to bind to the application 130. Thus, location is a criterion used to "validate" an information service. When the location passes outside of a coverage legion of an information service 160, the information service 160 is assumed to be invalid. Other criteria used to validate an information service 160 are described in more detail below Illustratively, the dynamic service binding system 135 usually provides an interface to the application 130 suitable for interacting with the application 130. For instance, if the application 130 expects an information service 160 to be a mapping information service, the dynamic service binding system 135 provides a mapping information service interface. This is described in more detail below.

In one embodiment, a dynamic service binding system 135, as described in additional detail below, changes a binding between an application 130 and an information service 160 by changing a reference to the information service 160 However, any technique that is used to direct or redirect communications between the application 130 and an information service 160 may be used to bind application 130 and information service 160

As explained in more detail below, application 130 generally requests a certain information service 160 meeting particular criteria, generally expressed in the form of capability requirements In general, an information service 160 will have a programmatic interface (not shown), i.e., which is accessed by application 130 and not by users of a wireless device 110. The dynamic service binding system 135 determines location of the wireless device 110 and initializes connections to an appropriate information service 160, if an appropriate information service 160 is found. The information service 160 is bound to the application 130, preferably through a reference as described below. As the wireless device 110 travels, it may leave the coverage region of the information service 160. Alternatively, the wireless device 110 may enter a coverage region of a "better" information service 160. The "better" information service 160 is determined via certain criteria. Moreover, the original information service 160 may fail As another example, a new information service 160 may become available, even if the mobile device does not change location. The new information service may be better than the current information service 160, as determined through certain criteria provided by the user or the operator of the application server 100 These conditions could cause the original information service 160 to become invalid and the dynamic service binding system 135 will determine the invalidity of the information service 160 and will bind the application 130 to a new information service 160. Communications for the original information service 160 will be redirected to the new information service 160. This redirection should be totally transparent to the application 130.

It should be noted that the application 130 may also be part of wireless device 110.

Although wireless networks and wireless devices are used as examples throughout the present disclosure, the present invention is not limited to wireless networks and wireless devices For instance, a person with a laptop computer connected to telephone lines might desire to connect to a directory information service when the person is in a location far from a normally used directory information service. An application 130 may be able to determine the location of the laptop through, for instance, dialing properties. The dynamic service binding system 135 can then use the dialing properties to properly select a directory information service for the wireless device 110

The following are examples of what functions a dynamic service binding system 135 might provide For any information service 160 in use by an application 130, dynamic service binding system 135 should be able to monitor the validity of the information service 160 (e.g., whether the location of the mobile device remains within the coverage region for the information service 160) and look for another information service 160 when the current information service 160 becomes invalid. If an information service 160 is found that has the capabilities the application 130 requires, the dynamic service binding system 135 should be able to change bindings dynamically so that the change in providers is transparent to the application 130. This includes performing whatever initial steps are necessary before the information service 160 is used (e.g., authentication).

A dynamic service binding system 135 should also be able to change bindings when an information service 160 that meets preferences of the user becomes available for a new location. In this example, the new information service 160 exceeds the original information service 160 via predetermine criteria such as user preferences.

Dynamic service binding should also be provided in case of information service failure. This is called "failover" herein. In case of information service failure, the dynamic service binding system 135 should select another information service 160 with a compatible information service 160, assuming a compatible information service 160 exists, and bind the application 130 to the compatible information service 160.

Dynamic binding should also accommodate wholesale changes in the service environment, as when there is a transition from a general, outdoor service environment to a specialized, perhaps indoor environment. In this case, the dynamic service binding system 135 may need to switch information services 160 for several location services, and may need to switch carrier location technology 140 (or an interface thereto, as described in reference to FIG. 2).

As is known in the art, the methods and apparatus discussed herein may be distributed as an article of manufacture that itself comprises a machine readable medium, such as one of a number of media 170, containing one or more programs which when executed implement embodiments of the present invention. For instance, the machine readable medium may contain a program configured to dynamically bind application 130 to one or more information services 160. The machine readable medium may be a recordable medium (e.g., a hard drive or an optical disk) or may be a transmission medium (e.g., a network comprising fiber-optics, the Internet 150, a wireless network 120 using time-division multiple access, code-division multiple access, or other radio-frequency channel, such as that used on wireless network 120). Any medium known or developed that can store information suitable for use with a computer system may be used.

Processor 180 can be configured to implement the methods, steps, and functions disclosed herein. The memory 185 could be distributed or local and the processor 180 could be distributed or singular. The memory 185 could be implemented as an electrical, magnetic or optical memory, or any combination of these or other types of storage devices. Moreover, the term "memory" should be construed broadly enough to encompass any information able to be read from or written to an address in the addressable space accessed by processor 180. With this definition, information on a network is still within memory 185 because the processor 180 can retrieve the information from the network. It should be noted that each distributed processor that makes up processor 180 generally contains its own addressable memory space. It should also be noted that some or all of dynamic service binding system 135 can be incorporated into an application-specific or general-use integrated circuit.

Referring now to FIG. 2, a block diagram shows an exemplary dynamic service binding system 135 in more detail. Exemplary dynamic service binding system 135 interacts with the mobile device 290 through application 130, a wireless network 250, and an information service 160-1 through the Internet 150. Only one information service 160 is shown for simplicity.

Dynamic service binding system 135 comprises, in this example, a service proxy 210, a service adapter 220, a network interface 221, a carrier location adapter 225, a context provider 245, a location service factory 230, and a service properties database 240 Service proxy 210 comprises a reference 215. Location service factory 230 comprises a context interface 235 and context 237 Context 237 comprises a position 238 of a mobile device.

Application 130, as described above, is an application that makes use of an information service. A typical example is a personal navigation application that allows users to request maps of particular locations, driving instructions from one place to another, and the locations of stores and other points of interest.

Service proxy 210 is a module with a reference 215 to a service adapter 220, and preferably having the same interlace as the service adapter 220. The value of the reference 215 can be modified in order to refer to a different service adapter 220, in case, for example, the original service adapter 220 fails or a mobile device changes locations The service adapter 220 is a local proxy fox the Internet-hosted information service 160-1. The service adapter 220 manages the low-level protocol of the Internet-hosted information service 160-1 and manages initialization-time functions such as authentication. The service adapter 220 is linked to one information service 160, such as information service 160-1. Thus, once reference 215 is set for a particular service adapter 220, the application 130 is bound to a specific information service 160, such as information service 160-1. It may be possible for one service adapter 220 to link to more than one information service 160. In this situation, the service adapter 220 would be adapted to have its own reference (not shown) as to which information service 160 the service adapter 220 is to reference.

It should be noted that a single application 130 could access multiple service adapters 220 in order to access multiple information services 160. For instance, an application provider may contract with one information service provider for maps and another for directory information. Or, the application provider may allow the user to choose his or her information service providers. In these instances, the reference 215 may have multiple references, each reference binding the application to a specific service adapter 220. Alternatively, as described above, a service adapter 220 may be made to access multiple information services 160.

An information service 160, such as information service 160-1, is a service provided via the network interface 221 over the Internet, typically using the HTTP protocol. Examples of services are directory services providing telephone numbers and locations of residences and business and mapping services providing maps of interstate roads, intrastate roads, and perhaps points of interest. An information service 160 does not have to be an Internet-based service, although that typically will be the case. For example, the information service 160-1 could reside on an asynchronous transfer mode network, an intranet, a "plain old telephone system" (POTS) network, or a cellular phone network offering, for instance, text information via an information service. An information service 160 can be any service for which a user can withdraw information requested by the user through an application.

The carrier location adapter 225 is an adapter for the particular carrier location technology 140 that determines the location of the mobile device 290. The carrier location adapter 225 will typically use a location-determining service provided by the wireless carrier, such as a wireless carrier controlling wireless network 250 The carrier location adapter 225 may have a timing function, so that the carrier location adapter 225 will periodically ascertain the location of a mobile device 290 via the carrier location technology 140. Alternatively, the location service factory 230 can periodically query the carrier location adapter 225 in order to determine the location of the mobile device 290. Furthermore, some cellular systems will "hand off" cellular phone users when the users move from cell to cell. This handing off process could trigger a message to or through the carrier location adapter 225 informing the location service factory 230 of the updated location of a cellular phone user.

The location service factory 230 is a module that performs, among other things, the functions of service adapter 220 creation and rebinding. This is described in more detail below.

The service properties database 240 is a database containing service properties, examples of which include a coverage region for an information service 160 and, in the case of a service that returns maps, the image formats the service is capable of providing. The service properties database 240 is described in additional detail in reference to FIG. 3.

The context provider 245 is a module delivering user context information, denoted as context 237. Context 237 is converted to a user position 238 by the location service factory 230. The context 237 can be in GPS coordinates, for instance, and the user position could be maintained in the GPS coordinates or converted to a simpler location, such as "Connecticut." The context provider 245 could be a module containing a location for a user that the user has entered, for instance. For cellular phone systems, the user may only be able to be located via knowing in which cell the mobile phone used by the user is The context provider 245 can then inform the context interface 235 of at least where the cell is or an area encompassed by the cell. Additionally, the context provider 245 may also determine when another information service is registered in the service properties database 240, as registration of another device can be a criterion used to determine validity of an information service.

The context interface 235 is an interface through which context information is delivered. The context interface 235 is adapted to read context information and, when required, convert the context information to a position of a mobile device. Context information generally comprises position information about a mobile device. However, context information may also comprise messages about the status of the information service. For instance, as described in more detail below, the context information can be a message indicating failure of the information service It should be noted that there could be multiple carrier location adapters 225 corresponding to various mobile devices 290. For instance, a mobile device 290 might use cellular service having GPS location services, while another mobile device 290 might not have GPS location services. These two mobile devices would then have two different carrier location adapters 225.

It should be noted that the different entities making up dynamic service binding system 135 are merely exemplary. The entities could be combined, further subdivided, or deleted For instance, the location service factory 230 and the service proxy 210 could be combined. As another example, the location service factory 230 could be divided into a portion handling context and a portion that changes reference 215, instantiates service adapter 220, and determines when to redirect communications between an application 130 and an information service 160 based on validity of the information service 160. Additionally, the dynamic service binding system 135 may not contain the network interface 221, which can be separate The carrier location adapter 225 and the context provider 245 can also be separate from the dynamic service binding system 135. In the examples given herein, many of entities can be implemented through software modules. However, portions of one or more entities can also be implemented in hardware, such as through an integrated circuit.

Figure 3:
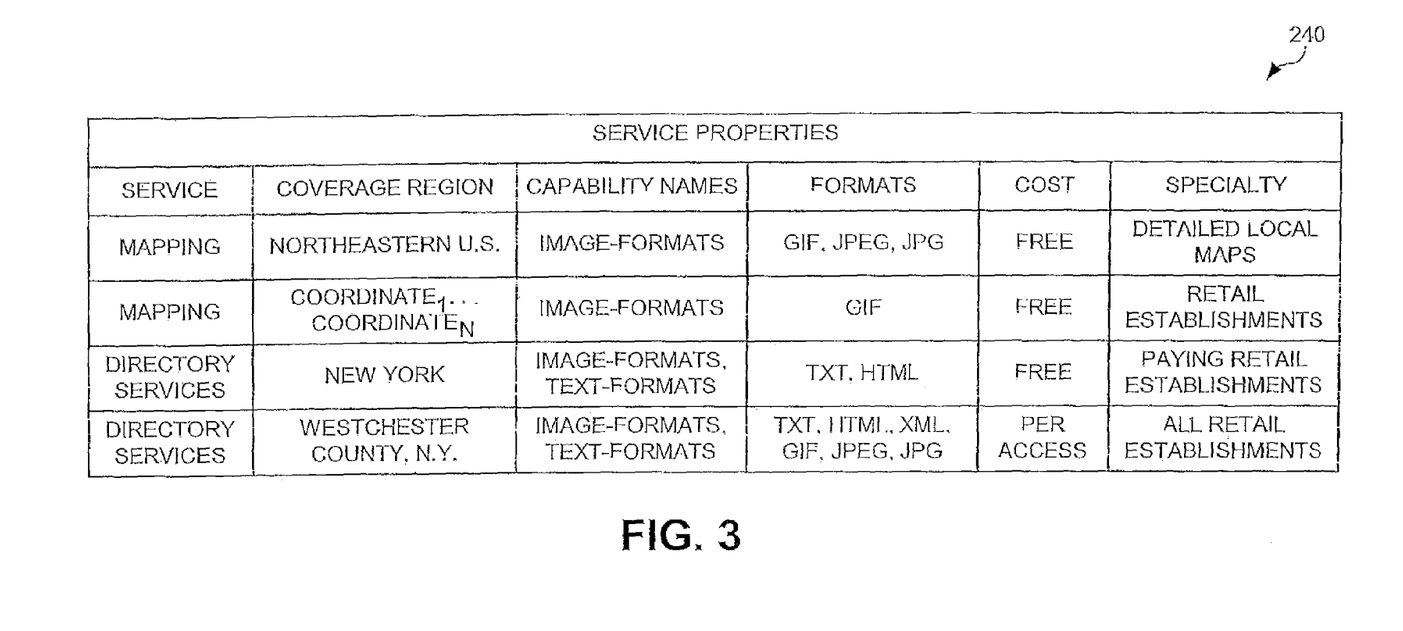
FIG. 3 is an exemplary table representing service properties, in accordance with one embodiment of the present invention.

Turning now to FIG. 3, an example of the service properties database 240 is shown. In this example, the service properties database 240 is implemented as a table, which has a number of service properties. There are two mapping services and two directory services, each of which has a defined coverage region. The simple terms of "Northeastern U S.," "New York," and "Westchester County, N Y." can be converted, if desired, to a number of coordinates demarcating the coverage region. It should be noted that these coverage regions can be completely arbitrary. In particular, coverage regions do not necessarily correspond to the cells of wireless communications services. The "capability names" are capabilities provided by the service, and the "formats" are those supported by the service. The "cost" is an example of how much each service costs for access to the information the service provides. The "specialty" gives additional text about the information provided by the service.

Generally, the mobile service provider (e.g., cellular phone carrier) populates the service properties database 240. However, as described below, user preferences may be added to the service properties database 240. This may entail giving the user access to the service properties database 240 or having the mobile service provider ask the user his or her preferences and adding the preferences for the user to service properties database 240

Figure 4:
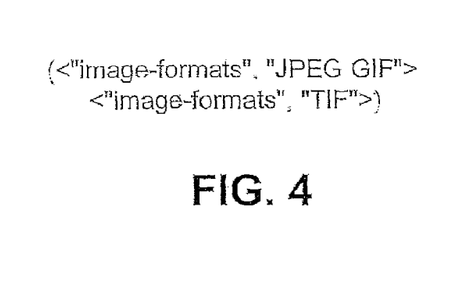
FIG. 4 is an example of a capability requirement, in accordance with one embodiment of the present invention.

As described in more detail below, the cost and specialty properties (and any properties added via preferences of a user) can be used to validate an information service For instance, a user could indicate a preference for only free services. Thus, if the user is in Westchester County, New York, the location service factory 230 could select the free directory service. Alternatively, under the "aggressive" scheme described below, the location service factory 230 would select the directory service having the per access fee because this directory service has more information about the particular area the user is in. User preferences are more specifically described in reference to FIG. 8 below The application 130 generally requests from the location service factory 230 an information service 160 meeting certain criteria. In a request, the application 130 includes one or more "capability" sets that specify its requirements and preferences. A capability set, as shown in FIG. 4, comprises a name and a set of values. A capability requirement is a name and a single value. In the example of FIG. 4, there are two capability sets, <"image-formats", "JPEG GIF"> and <"image-formats", "TIF">, but three capability requirements, <"image-formats", "JPEG">, <"image-formats", "GIF"> and <"image-formats", "TIF">. The registered capabilities, stored in service properties database 240, of an information service 160 "satisfy" a set of required capabilities if, for each capability requirement, the registered capabilities for an information service 160 have a capability of the same name that includes the value of the requited capability. For instance, <"image-formats", "GIF JPEG"> satisfies <"image-formats", "GIF"> In the example of FIG. 3, a capability requirement of <"text-formats", "TXT"> is met by both directory services but not by either mapping service. The capability sets of <"image-formats", "GIF">, <"text-formats", "TXT"> is met only by the directory service for Westchester County, N.Y.

Generally, when an application 130 requests an information service 160 that meets capability requirements, the capability sets are assumed to be in a preference order, with the highest capability sets listed first. For example, in FIG. 4, the capability set of <"image-formats", "PEG GIF"> is assumed to be preferred over the capability set of <"image-formats", "TIF">. This preference in capability sets may be used to sort candidate information services 160, if desired.

Figure 5:
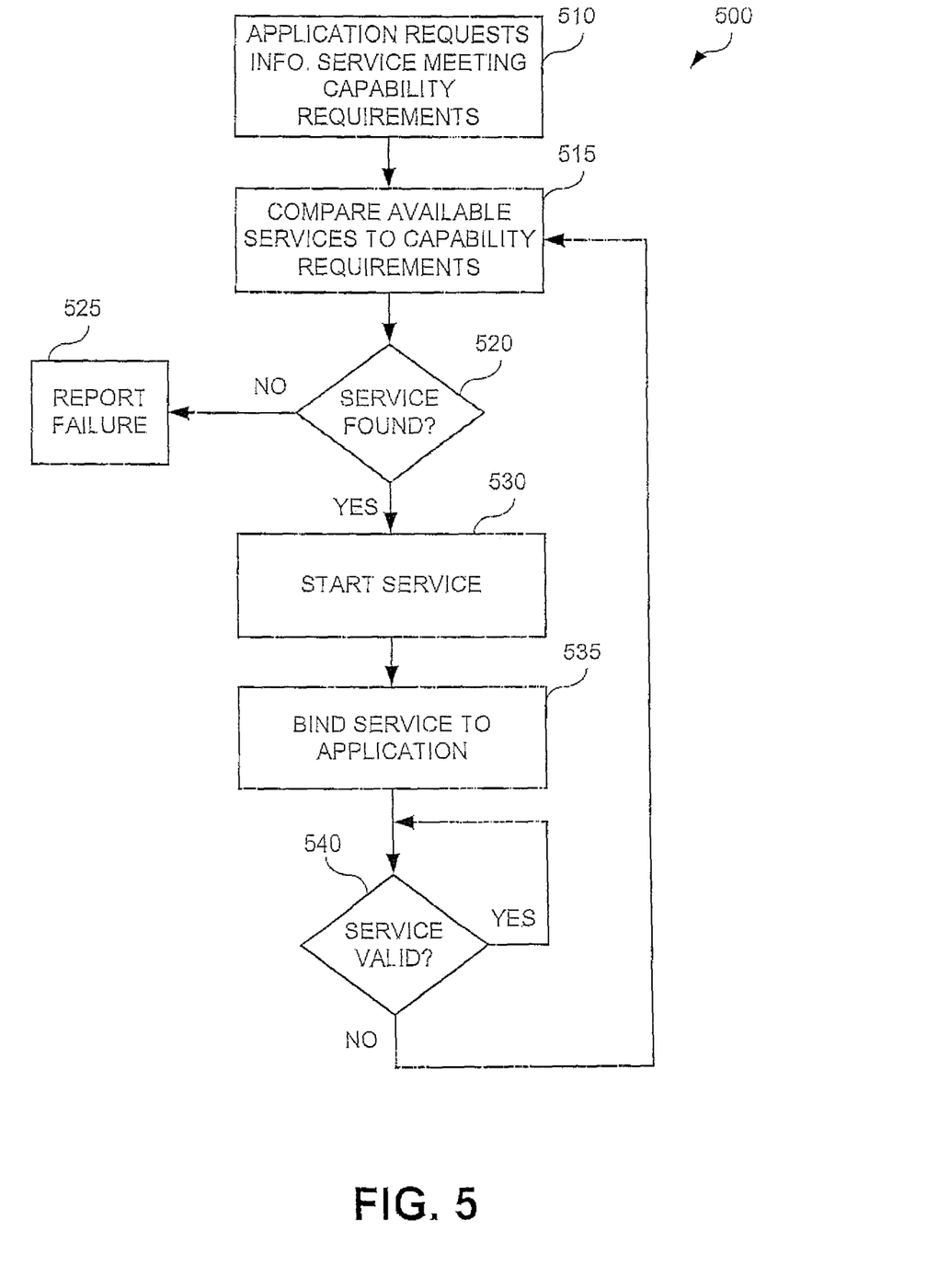
FIGS. 5 through 7 are exemplary methods for dynamically binding information services, in accordance with embodiments of the present invention.

Turning now to FIG. 5, an exemplary method 500 is shown for dynamically binding information services, in accordance with one embodiment of the present invention Method 500 is performed by a dynamic service binding system 135 in order to bind an information service 160 to an application 130 and to rebind information services 160 when certain criteria are met.

Method 500 begins in step 510 when an application 130 requests a information service 160 meeting particular criteria. As described above, the request by the application 130 includes one or more capability sets that specify requirements and preferences of the application 130. The first capability set is generally taken as the most preferred. In step 515, the capability sets are compared, generally in order of preference, with capabilities for information services 160 The capabilities of the information services 160 are stored as properties in the service properties database 240, as shown in FIG. 3 The properties stored in the service properties database 240 contain the capabilities of all information services that are registered with the application server 100 having the service properties database 240. If no information service 160 is found (step 520=NO), then a failure is reported. This occurs in step 525. If one or more information services 160 that fulfill one of the capability requirements are found (step 520=NO), a service adapter 220 is instantiated for the first information service in a list of found information services and signaled to initialize itself (step 530). The list is generally a candidate list sorted via certain criteria, such as preferences given by the application, user preferences, or both. The service adapter 220 may at this time, for testing the information service 160 or for authentication, communicate with the information service 160. A service proxy 210 is then instantiated for the service adapter 220 and a reference to the service proxy 210 is returned to the application 130. This also occurs in step 530.

The application 130 is bound to the information service 160 via a reference placed in the service proxy 210. This occurs in step 535. The reference in the service proxy 210 causes communications from the application 130 to be directed to the service adapter 220 and therefore to a specific information service 160.

At some time, the application 130 makes a service invocation on the service proxy 210, which passes the service invocation through to the service adapter 220. The service adapter 220 performs its function of adapting the invocation to the protocol used by the information service In the case of an Internet service, this will include opening a network connection to the information service, serializing the objects of the invocation argument, and writing them to the network stream. Data returned in the stream should be deserialized into objects to be returned to the application 130 through the service proxy 210.

Once the information service has been bound to the application 130, there is a determination of whether the information service 160 is still valid. This occurs in step 540. This determination is usually periodic, but need not be For example, the determination could be driven by messages from a cellular phone system that a mobile device has been passed off to another cell. These messages may occur relatively randomly. In the example of FIG. 5, a criterion used to determine validity of a service is location When the location of the mobile device is determined to be outside of the coverage area for the information service 160 currently bound to the application 130, then the method continues in step 515. Consequently, a new information service, if one is found (step 520), is selected, started (step 530), and bound to the application 130 (step 535). This example just described is a simple example where the location of a mobile device is determined and the method 500 determines whether the location is within the coverage legion of the current information service.

Figure 6:
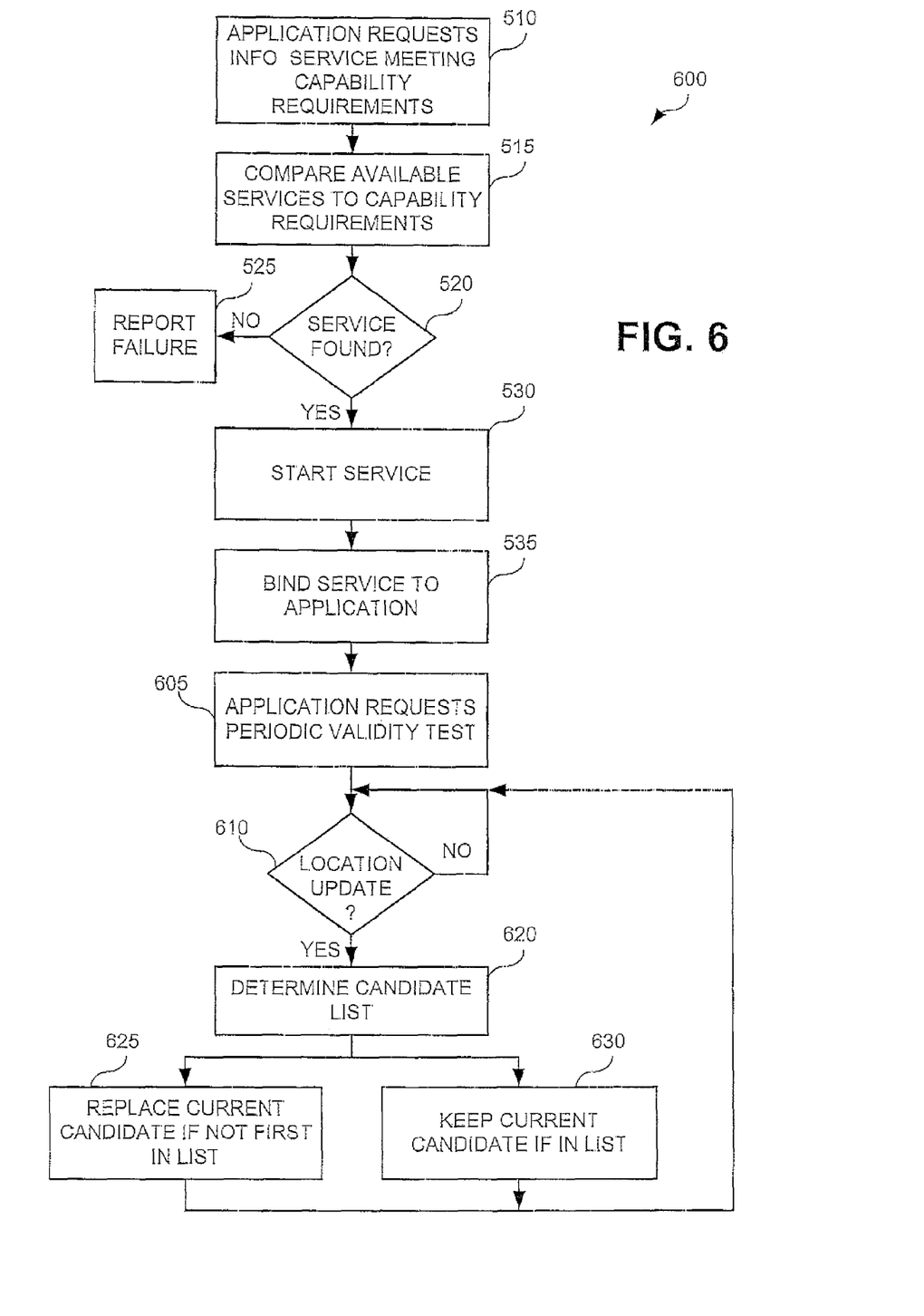

It is also possible to have more complex procedures for determining whether an information service is valid. For example, a more complex method 600 for replacing services based on the user moving in and out of service coverage regions is shown in FIG. 6 Steps 510 through 535 are the same as in method 500 of FIG. 5.

In step 605, an application 130 instructs the location service factory 230 that the application 130 requires that the information service to which the application 130 is bound to periodically have validity of the information service determined. The application 130 includes, in a message for example, a reference to the carrier location adapter 225 that corresponds to the mobile device using the application 130, and a time interval specifying how often to evaluate information service replacement. The time interval is used to determine when to perform step 610. As a response to step 610, the location service factory 230 begins a process through which the location service factory 230 will receive periodic notification of the position of the mobile device. This may be through using a periodic notification function provided by the carrier location technology or its carrier location adapter, or one provided by the location service factory 230 itself. Notifications are delivered through the context interface 225 of the location service factory 230.

Upon each update of the location of the mobile device (e.g., received through notification or its own periodic requests) in step 610, the location service factory 230 evaluates whether the current information service in use is still valid for the location of the mobile device, or whether there is an information service 160 that better meets the capability requirements requested by the application 130. Replacement may be aggressive or non-aggressive. A list of candidate information services, if there are any candidates, is determined in step 620 by comparing the capability requirements given by the application 130 with capabilities, for the information services, stored in the service properties database 240. The order in which the capability requirements are given by the application 130 is assumed, in an embodiment, to be in order of preference by the application 130. Additionally, user preferences or preferences set by the application server owner may be used to set an order For aggressive replacement, the existing information service 160 is replaced (step 625) if it is not the first service in the list. For non-aggressive replacement, the existing service is replaced only if it is not in the list of candidates (step 630). All candidate information service 160 evaluations include determining whether the current location for the mobile device is in the coverage region of an information service 160.

It should be noted that the user preferences and capability requirements are criteria that can be used to sort the candidate list. It is also possible to determine a value for each information service 160 in the candidate list, according to the criteria. In the case of sorting the information services, the sort older, which can be given values, determines which information service 160 should be chosen. It is also possible for the candidate list to be not sorted and have, instead, values assigned to each information service 160 defined by the criteria.

Figure 7:
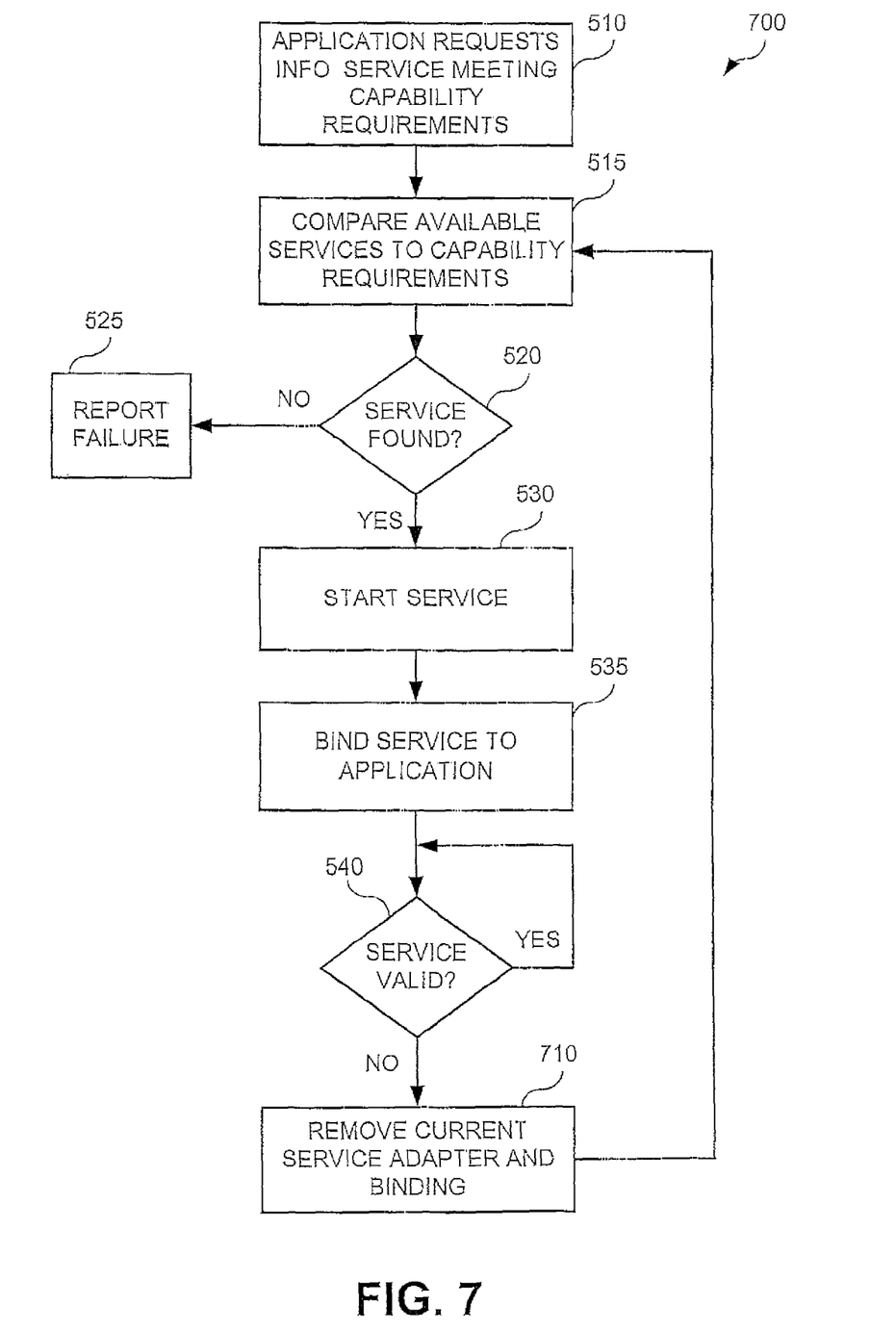

Another criterion used to determine a validity of an information service 160 is information service failure. This is shown in FIG. 7, where method 700 uses information service failure to determine validity of an information service 160. Steps 510 through 540 are the same as in FIG. 5. A service adapter 220 can determine that the information service 160 to which it is associated has failed, for instance when the information service 160 fails to respond or is unavailable. When the information service 160 is determined to be invalid in step 540 (step 540=YES), the service adapter 220 signals invalidity of the information service 160 to the service proxy 210, for instance, by issuing a ServiceFailure exception to the service proxy 210. The current service adapter 220 and binding are removed in step 710. The current service adapter 220 is unloaded from memory and the binding is removed by removing the reference to the service adapted from the service proxy 210.

The service proxy 210 may then initiate service replacement by, for instance, sending a replaceService message to the location service factory 230 through the context interface this would continue the method in step 515. In step 515, the location service factory 230 first obtains the capability requirements of the original information service 160 from the service proxy 210. Using the capability requirements, a suitable replacement candidate is determined, via the same procedure described above in steps 520 through 535. If a replacement candidate is found (step 520=YES), a service adapter 220 is instantiated for the information service 160 and the service adapter 220 is signaled to initialize itself, also as described above (step 530). The location service factory 230 then sends, for example, a setAdapter message to the service proxy 210 containing a reference to the new service adapter 220 (step 530). The reference to the service adapter 220 is placed in the service proxy 210 in order to bind the application 130 to the information service 160 (step 535). The service proxy 210 will then retry connecting to the information service 160 in order to fulfill any outstanding request by the application 130. If the application 130 has registered to be notified of a service replacement, a notification containing the name of the replacement service is sent at this time The information service replacement may be generalized to "opportunistic" service replacement by allowing arbitrary events to trigger information service replacement evaluation. For example, the addition of a newly available service to the service properties database 240 may be such an event As with location, in which the location service factory 230 indicates interest in location events by registering with the cattier location adapter, the location service factory 230 registers interest in particular events with a context provider This context provider delivers context events through the context interface of the location service factory 230.

Other events to trigger replacement evaluation could be user preferences. If a user chooses to preferentially access free services, and a free information service becomes available as the user enters the coverage region of the free service, the current information service in use by the user may be replaced if the current service charges access fees. For instance, in FIG. 8, a portion of service properties database 240 is shown having user preferences and user carrier information. From FIG. 8, it can be seen that USER A prefers free information services and the replacement of information services should be performed in a non-aggressive manner, as described above. By contrast, USER B prefers comprehensive information services, which may or may not be free. The USER B also prefers that the replacement of services be handled in an aggressive manner, as described above Additionally, the user preferences may be used to sort a candidate list of information services. Thus, for USER A, a free information service should be sorted in such a way that the free information service is selected before a pay information service FIG. 8 also shows information about which mobile carrier the user uses. In this example, both users use mobile carriers, such as a cellular phone carrier. However, the carrier could be network-based, or some other carrier. For example, when a user is traversing a large building complex, the user could leave the range of an access point and come into range of another access point. Coverage legions for internal telephone numbers and building complex information might also change via information services In the example of FIG. 8, USER A uses MOBILE CARRIER 1 and USER B uses MOBILE CARRIER 2. This carrier information allows the location service factory 230 to determine which carrier location adapter 225 to use.

Figure 8:
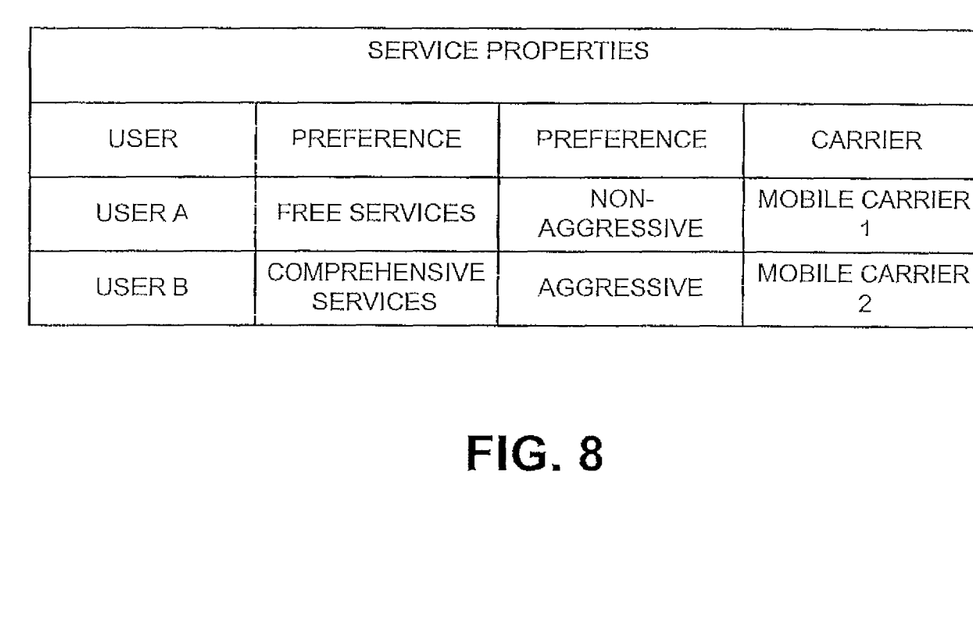
FIG. 8 is an exemplary table representing a portion of a service properties database including user preferences, in accordance with one embodiment of the present invention.

FIG. 8 may also be used by the application server 100 owner For example, a cellular phone company may require users to use free services when there is a choice between the free information service 160 and an information service 160 that costs the cellular phone company money for which the cellular phone company is not reimbursed by the user.

It is to be understood that the embodiments and variations shown and described herein are merely illustrative of the principles of this invention and that various modifications may be implemented by those skilled in the art without departing from the scope and spirit of the invention.

What is claimed is:

1. A method for switching information services, the method comprising steps of:
   determining whether a location of a mobile device is within a coverage region of a first information service;
   determining whether the first information service has failed; and
   redirecting at least one communication between a mobile device and the first information service to a second information service when the first information service has failed, wherein said second information service is selected based on an order, wherein said order is based on a sorted candidate list of information services associated with said coverage region, wherein one or more of said steps are performed by at least one processor.

2. The method of claim 1, further comprising the step of:
   selecting the second information service by selecting an information service from one or more information services having coverage regions encompassing the location of the mobile device.

3. The method of claim 1, wherein the step of determining whether said location of said mobile device is within said coverage region of said first information service further comprises the step of periodically determining whether the location of the mobile device is within a coverage region of a first information service.

4. The method of claim 3, wherein the step of periodically determining whether said location of said mobile device is within said coverage region of said first information service further comprises the step of periodically determining, by using predetermined criteria, said candidate list of information services.

5. The method of claim 4, wherein the predetermined criteria comprises one or more preferences and wherein the candidate list is sorted in order of the one or more preferences.

6. The method of claim 4, wherein the step of periodically determining, by using predetermined criteria, the candidate list of information services further comprises the step of selecting an information service having a highest value according to the predetermined criteria from the candidate list, and wherein the step of redirecting at least one communications further comprises redirecting the at least one communications for the first information service to the information service having the highest value in the candidate list when the first information service is not the information service having the highest value in the candidate list.

7. The method of claim 4, wherein the step of periodically determining, by using the predetermined criteria, the candidate list of information services further comprises the steps of determining whether the first information service is in the candidate list, and allowing the at least one communications to the first infoiiiiation service when the first information service is in the candidate list.

8. The method of claim 1, wherein the mobile device accesses an application bound to the first information service.

9. The method of claim 1, wherein the step of redirecting the at least one communications further comprises the steps of instantiating a new service adapter and deleting an old service adapter.

10. An apparatus for switching information services, comprising:
    a memory; and
    at least one processor, coupled to the memory, operative to:
    determine whether a location of a mobile device is within a coverage region of a first information service;
    determine whether the first information service has failed; and
    redirecting at least one communication between a mobile device and the first information service to a second information service when the first information service has failed, wherein said second information service is selected based on an order, wherein said order is based on a sorted candidate list of information services associated with said coverage region.

11. The apparatus of claim 10, wherein the at least one processor is further operative to:
    select the second information service by selecting an information service from one or more information services having coverage regions encompassing the location of the mobile device.

12. The apparatus of claim 10, wherein the at least one processor is further operative to:
    create the candidate list of information sources by using predetermined criteria.

13. The apparatus of claim 10, wherein the at least one processor is further operative, when determining whether said location of said mobile device is within said coverage region, to periodically determine, by using predetermined criteria, the candidate list of information services.

14. The apparatus of claim 13, wherein the at least one processor is further operative:
    when periodically determining whether the location of the mobile device is within the coverage region, to select an information service having a highest value according to the predetermined criteria from the candidate list; and
    when redirecting, to redirect the at least one communications for the first information service to the information service having the highest value in the candidate list when the first information service is not the information service having the highest value in the candidate list.

15. The apparatus of claim 13, wherein the at least one processor is further operative, when periodically determining whether said location of said mobile device is within said coverage region, to determine whether the first information service is in the candidate list, and to allow the at least one communications to the first information service when the first information service is in the candidate list.

16. A non-transitory article of manufacture for switching information services, comprising:
    a computer readable medium containing one or more programs which when executed implement the steps of:
    determining whether a location of a mobile device is within a coverage region of a first information service,
    determining whether the first information service has failed; and
    redirecting at least one communication between a mobile device and the first information service to a second information service when the first information service has failed, wherein said second information service is selected based on an order, wherein said order is based on a sorted candidate list of information services associated with said coverage region.

17. A method for switching information services, the method comprising the steps of:
    determining whether a location of a mobile device is within a coverage region of a first information service;
    determining whether the first information service has failed;

redirecting at least one communication for the first information service to a second information service when the first information service has failed, wherein said second information service is selected based on an order, wherein said order is based on a sorted candidate list of information services associated with said coverage region;

comparing one or more compatibility sets with properties of the first information service in order to determine whether properties of the first information set meet requirements of the one or more compatibility sets;

redirecting the one or more communications for the first information service to the second information service when the properties of the first information service do not meet the requirements of the one or more compatibility sets; and determining that properties of the second information service do meet the requirements of the one or more compatibility sets, wherein one or more of said steps are performed by at least one processor.

18. The method of claim 17, further comprising the step of:

selecting the second information service by selecting an information service from one or more information services having coverage regions encompassing the location of the mobile device.

19. The method of claim 17, wherein the step of determining whether said location of said mobile device is within said coverage region of said first information service further comprises the step of periodically determining whether the location of the mobile device is within a coverage region of the first information service.

20. The method of claim 19, wherein the step of periodically determining whether said location of said mobile device is within said coverage region of said first information service further comprises the step of periodically determining, by using predetermined criteria, the candidate list of information services.

21. The method of claim 20, wherein the predetermined criteria comprises one or more preferences and wherein the candidate list is sorted in order of the one or more preferences.

22. The method of claim 20, wherein the step of periodically determining, by using predetermined criteria, the candidate list of information services further comprises the step of selecting an information service having a highest value according to the predetermined criteria from the candidate list, and wherein the step of said redirecting at least one communications further comprises redirecting the at least one communications for the first information service to the information service having the highest value in the candidate list when the first information service is not the information service having the highest value in the candidate list.

23. The method of claim 20, wherein the step of periodically determining, by using predetermined criteria, the candidate list of information services further comprises the steps of determining whether the first information service is in the candidate list, and allowing the at least one communications to the first information service when the first information service is in the candidate list.

24. The method of claim 17, wherein the mobile device accesses an application bound to the first information service.

25. The method of claim 17, wherein the step of redirecting the at least one communications further comprises the steps of instantiating a new service adapter and deleting an old service adapter.

* * * * *